United States Patent Office 3,840,557
Patented Oct. 8, 1974

3,840,557
10,4a-IMINOMETHANOHYDROPHENANTHRENE
DERIVATIVE
John P. Yardley, King of Prussia, and Richard W. Rees and Herchel Smith, Bryn Mawr, Pa., assignors to American Home Products Corporation, New York, N.Y.
No Drawing. Filed Aug. 31, 1972, Ser. No. 285,155
Int. Cl. C07d 27/30
U.S. Cl. 260—326.5 B          8 Claims

ABSTRACT OF THE DISCLOSURE

Compounds of the formula:

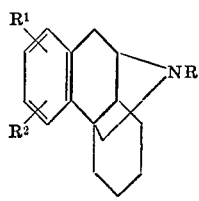

in which

R is a member selected from the group consisting of hydrogen, lower alkyl cyclopropylmethyl, phenethyl, benzyl, p-aminophenyl(lower)-alkyl, p-methoxyphenyl (lower)alkyl, p - hydroxyphenyl(lower)alkyl, lower alkenyl, chloro(lower)alkenyl, lower alkynyl and thiophene-2-yl;

$R^1$ and $R^2$ are independently members selected from the group consisting of the H—, hydroxy, lower alkoxy, lower alkyl and lower alkanoyloxy radicals, and pharmaceutically acceptable acid addition salts thereof, exhibit analgesic activity when administered parenterally to warm blooded vertebrates.

BACKGROUND OF THE INVENTION 10,4a-Iminoethanohydrophenanthrene derivatives such as 3-hydroxy-N-methylmorphinan (Grewe, Naturwiss. 33 (1946) 333; Swiss Pat. 280,674; U.S. Pat. 2,744,112) and 3-hydroxy-N-methylisomorphinan (Hellerbach et al., Synthetic Analgesics, part IIA (1966), pp. 32–33, Pergamon Press) are known analgesic compounds. The morphinan series of compounds possess the 10,4a-iminoethanobridge in a six membered heterocyclic ring.

BRIEF DESCRIPTION OF THE INVENTION

In accordance with this invention there is provided a process for the production of chemical compounds, the chemcial compounds themselves, useful as analgesics and anti-inflammatory agents, and the intermediate products of the process which are useful in the preparation of the biologically active analgesics and anti-inflammatory agents.

The compound aspect of this invention embraces those compositions of matter depicted by the structural formula:

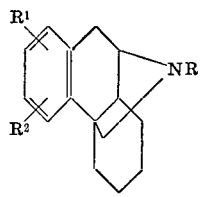

wherein

R is a member selected from the group consisting of hydrogen lower alkyl, cyclopropylmethyl, phenethyl, benzyl, p-aminophenyl(lower)alkyl, p-methoxyphenyl (lower)alkyl, p - hydroxyphenyl(lower)alkyl, lower alkenyl, chloro(lower) alkenyl, lower alkynyl and thiophene-2-yl;

$R^1$ and $R^2$ are independently members selected from the group consisting of the H—, hydroxy, lower alkoxy, lower alkyl and lower alkanoyloxy radicals; and the physiologically acceptable salts thereof.

The preparation of the compounds embraced by the preceding structural formula may be illustrated by the reaction sequence:

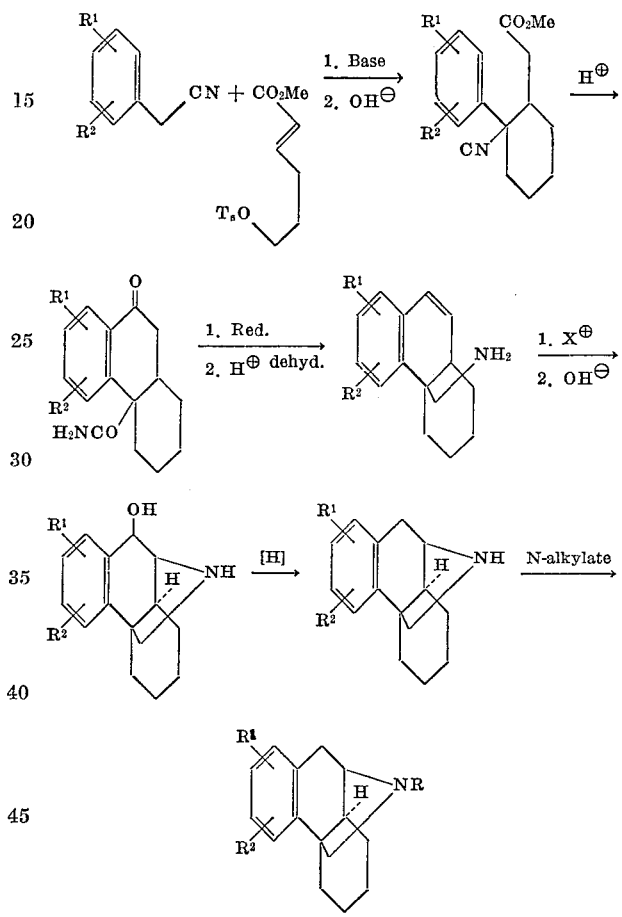

in which R, $R^1$ and $R^2$ represent substituents defined above, and $X^+$ is a halonium ion.

Thus, phenylacetonitrile or a substituted phenylacetonitrile reacts with an alkyl 7-tosyloxy-hept-2-enoate via double alkylation in the presence of a strong base such as an alkali metal alkoxide (sodium ethoxide, potassium t-butoxide), sodium amide, etc. The product ester is conveniently hydrolyzed with a base to afford the free carboxylic acid, the latter undergoing acid catalyzed cyclization to the highly crystalline tricyclic amide. Reduction of the carboxamido group with lithium aluminum hydride followed by an acid catalyzed benzylic hydroxyl group elimination to introduce olefinic unsaturation affords a compound amenable to cyclization without isolation of any intermediates, through treatment with N-bromosuccinimide, N-chlorosuccinimide, N-bromosuccinimide, and the like in the presence of perchloric acid, followed by cyclization of the amine by internal alkylation under strongly basic conditions) sufficiently basic to release the primary amine from any acid addition salt formed during production of the halonium adduct, as is formed during reaction with N-bromoacetamide and perchloric acid)

is readily effected. Hydrogenolysis of any remaining hydroxyl group of the halohydrin is achieved at elevated temperature in an acetic-perchloric acid system by hydrogenation in the presence of a noble metal or noble metal oxide. The product 10,4a-iminomethanohydrophenanthrene, may be N-alkylated before or after ether cleavage of any alkoxide present in the A-ring. N-alkylation of the 10,4a-iminomethanohydrophenanthrene may be performed with substituted or unsubstituted alkyl halide or sulfonate ester reactants to yield the desired product. Likewise, the imino nitrogen may be acylated with an acyl halide or an acid anhydride and subsequently reduced with lithium aluminum hydride to produce the desired N-substitution.

Where $R^1$ or $R^2$ are lower alkoxy groups, deoxyalkylation may be performed before or after alkylation of the hetero ring nitrogen atom. It is preferable to N-alkylate first and subsequently remove the alkyl group of any A-ring alkoxy substituent, the optional sequence of deoxyalkylation followed by N-alkylation being preferred for the introduction of N-alkyl groups which contain functional groups such as the allylic, propargylic and benzylic halides. Acylation of the free hydroxy group representing $R^1$ and $R^2$ proceeds conventionally. The preferred acylating agents being the acid halides and anhydrides of acetic, propionic, butyric and valeric acids.

Acid addition salts of the active analgesics are prepared by conventional techniques. By pharmaceutically acceptable acid addition salts, applicants intend to embrace addition salts of those acids which are conventionally employed in the production of administrable formulations such as the adducts of, without limitation, hydrochloric, hydrobromic, sulfuric, phosphoric, methane sulfuric, acetic, lactic, succinic, maleic, aconitic, phthalic, tartaric, embonic and fumaric acids.

The reactant esters of 7-alkylsulfonyloxy, 7-aryl sulfonyloxy- or 7-halo-hept-2-enoic acid are known compounds (British Pat. 1,030,497) prepared by condensing 5-hydroxy-pentanal with malonic acid in the presence of a base followed by decarboxylation. Tosylation or mesylation affords the blocked hydroxy group with suitable leaving groups. Likewise, reaction of the alkyl 7-hydroxyhept-2-enoate with $SOCl_2$ and the like, yields the 7-halo-analogue, suitable for use in the alkylation of a phenylacetonitrile.

Thus, the intermediate products formed in the individual dependent processing steps are useful as intermediates in the synthesis of those ultimate compounds which possess biological activity and may be described as compounds of the formula:

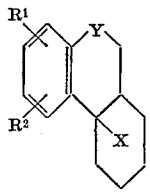

in which

X is —CN, —$CONH_2$, or —$CH_2NH_2$;
Y is >$CH_2$, ≥CH, >CHOH or >C=O; and
$R^1$ and $R^2$ are independently members selected from the group consisting of —H, —OH, lower alkoxy, lower alkyl and lower alkanoyloxy radicals.

As specific tangible embodiments of both the intermediate and final product aspects of this invention, there is herein provided specific exemplification of:

1,3,4,9,10,10aα-hexahydro-6-methoxy-9-oxo-4aβ(2H)-phenanthrene carboxamide,
1,3,4,9,10,10aα-hexahydro-6-methoxy-9-oxo-4aβ(2H)-phenanthrene carbonitrile,
1,3,4,9,10,10aα-hexahydro-9-oxo-4aβ(2H)-phenanthrene carboxamide,
4aβ-aminomethyl-1,2,3,4,4a,9,10,10aα-octahydro-6-methoxy-phenanthren-9-ol,
4aβ-aminomethyl-1,2,3,4,4a,10aα-hexahydro-6-methoxy-phenanthrene,
1,3,4,9,10,10aα-hexahydro-6-methoxy-2H-10,4a(iminomethano)phenanthren-9β-ol, hydrochloride,
1,3,4,9,10,10aα-hexahydro-6-methoxy-2H-10,4a-(iminomethano)phenanthrene, hydrochloride,
1,3,4,9,10,10aα-hexahydro-6-methoxy-11-methyl-2H-10,4a-(iminomethano) phenanthrene, hydrochloride,
1,3,4,9,10,10aα-hexahydro-11-methyl-2H-10,4a-(iminomethano) phenanthren-6-ol, hydrochloride,
1,3,4,9,10,10aα-hexahydro-2H-10,4a-(iminomethano) phenanthren-6-ol, and
1,3,4,9,10,10aα-hexahydro-11-(3-methyl-2-butenyl) - 2H-10,4a-(iminomethano) phenanthren - 6 - ol, hydrochloride.

The analgesic activity is observed upon parental administration (intramuscular or intraperitoneal) to warm blooded animals and was initially determined by standard pharmacological tests in rats at dosage concentrations from 12.5 to 30 milligrams per kilogram body weight. Thus, groups of 10 male rats (150–200 gram body weight) were placed in holders and the tips of their tails were exposed to a high intensity light beam, adjusted in intensity so that normal rats move their tails out of the light beam in 3 to 8 seconds. The compound tested was administered both intraperitoneally and intramuscularly and the reaction time of the rats was recorded every 20 minutes for two hours after drug administration. The base with which the readings were compared was the reaction time of the rats averaged from two readings taken twenty minutes apart, each of the 10 rats being originally selected and grouped on the basis of a response variance within one second. The change in reaction time before and after drug administration represents the analgesic influence of the drug. For example, the compound of Example IX, 1,3,4,9,10,10aα-hexahydro-11-methyl-2H-10,4a - (iminomethano)phenanthren-6-ol, hydrochloride, when tested by the rat tail flick test induced analgesia in one of five rats at 12.5 milligram per kilogram intraperitoneal administration and four of five rats at a 25 milligram per kilogram dose by the same route. Through intramuscular administration, four of 10 rats displayed analgesia at fifteen milligrams per kilogram while eight of ten exhibited analgesia at a thirty milligram per kilogram dose.

Furthermore, the compounds were tested for and displayed anti-inflammatory activity when administered orally to male rats (120–160 grams body weight) in which edema was induced by carrageenin injection sixty minutes after drug administration. The difference in swelling volume between the test animals right hind paw and that of a control group demonstrated an excess of 23 percent inhibition of swelling, the lower limit for acceptable activity. Illustrative of the anti-inflammatory activity are the properties of 1,3,4,9,10,10aα-hexahydro-6-methoxy-2H - 10,4a - (iminomethano)phenanthrene, hydrochloride and its 11-methyl analogue, which demonstrated a 33 percent and 37 percent inhibitive response, respectively, upon oral administration at a dosage level as low as 100 milligrams per kilogram body weight.

Thus, the compounds are valuable agents for treatment of domestic animals, such as dogs and horses and in laboratory animals, such as rats, mice and the like, responsive to administration of analgesic and anti-inflammatory agents, such as for relief of pain and edema. When used for these purposes, the compounds and salts thereof may be administered in any suitable pharmaceutical form, the dosages varying with the symptom, size of animal and technique of administration, among other things and being individually programmed for the subject.

DETAILED DESCRIPTION OF THE INVENTION

The following specific exemplification of the preparatory technique used to produce the compounds of this invention is presented to illustrate the invention rather than delimit its scope.

The term "lower" used throughout the specification to modify various terms such as, alkyl (in lower alkyl) and alkenyl (in lower alkenyl) is intended to describe that group of radicals or substituents containing from 1 to 7 carbon atoms commonly referred to as the "lower" members of the alkyl group of radicals.

EXAMPLE I

7-Hydroxy-trans-2-heptenoic acid, methyl ester, p-toluenesulfonate

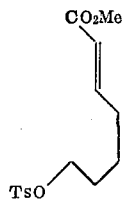

Methyl 7-hydroxy-trans-2-heptenoate acid (Raphael et al., J. Chem. Soc. 3813 [1961], British Pat. 1,030,491), 85 g. ($5.4 \times 10^{-1}$ moles) in pyridine (450 ml.) at 0° C. was treated over 2 minutes with p-toluenesulfonyl chloride 123 g. ($6.5 \times 10^{-1}$ moles) and the mixture allowed to reach room temperature over 6 hours. Ice was added and the mixture stirred for a further 45 minutes. After dilution with water the mixture was extracted with diethyl ether (twice) and the extracts washed successively with water, dilute sulfuric acid, water, $NaHCO_3$ solution, brine and dried over $Na_2CO_4$. After evaporation of the solvent the oily tosylate was used directly as in the next example.

IR 1730, 1660, 1600, 1360, 1180 cm.$^{-1}$. NMR ($CDCl_3$) 2.44 (3H singlet, p-$CH_3$), 3.72 (3 singlet, —$OCH_3$), 4.04 (2H approximate triplet, $C_7H_2$), 5.73 (1H centre of 2 triplets $C_2$-H, $J_{2/3}$ 15.5 cps., $J_{3/4}$ 7 cps.).

EXAMPLE II 1,3,4,9,10,10aα-Hexahydro-6-methoxy-9 - oxo - 4aβ(2H)-phenanthrene carboxamide

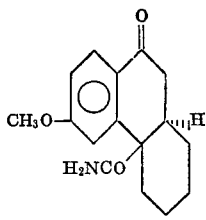

A mixture of m-methoxyphenylacetonitrile (20 g., $1.35 \times 10^{-1}$ moles) and 7-hydroxy-trans-2-heptenoic acid, methyl ester, p-toluenesulfonate (39.6 g., $1.27 \times 10^{-1}$ moles) in t-butanol (550 mo.) was added dropwise, during 3 hours, to a refluxing solution of potassium tert-butoxide 16.4 g. ($1.46 \times 10^{-1}$ moles) in t-butanol (300 ml.). The reaction mixture was refluxed for a further 3 hours under nitrogen and then stirred at room temperature overnight. Acetic acid (20 ml.) was added and the reaction mixture stripped to a small volume, diluted with water, and extracted with diethyl ether (twice). The ether extract was washed with water, brine, and evaporated, the residue in methanol (350 ml.) was heated under reflux with 20 percent NaOH solution (100 ml., $5 \times 10^{-1}$ moles NaOH during 2.5 hours. The reaction mixture was stripped to a small volume, diluted with water and extracted with diethyl ether (rejected). The aqueous solution was acidified strongly with hydrochloric acid and extracted (twice) with diethyl ether. The ether extracts were washed with brine, dried ($Na_2SO_4$) and evaporated to a partially crystalline residue (35 g.). The total residue was stirred with cold concentrated $H_2SO_4$ (1 liter) overnight and poured onto ice. The highly crystalline product (14 g.) precipitated and was recrystallized from acetone to give 10 g. m.p. 225–228° C.

IR 3350 (s), 3140 (s), 1690 (s), 1660 (s), 1595 (s), 1555 infl. cm.$^{-1}$. NMR (DMSO: 3.71 (3H s, —$OCH_3$), 6.75 $C_7$-H centre of a pair of doublets $J_{5/7}$ 2.5 cps., $J_{7/8}$ 8.5 cps.), 6.99 $C_5$-H doublet, $J_{5/7}$ 2.5 cps., $J_{5/8}$ 0 cps.), 7.62 ($C_8$-H doublet, $J_{7/8}$ 8.5 cps.), 6.66 (2H broad multiplet $CONH_2$) p.p.m.

Elemental analysis.—Calc'd for $C_{16}H_{19}O_3N$: Calc'd (percent): C, 70.31, H, 7.01, N, 5.13. Found (percent): C, 70.03, 70.54; H, 7.04, 7.17; N, 5.53, 5.15.

If the concentrated sulfuric acid cyclization step in the above example is allowed to proceed to 0° C. rather than at room temperature, small amounts of a more soluble (methanol), less polar, intermediate carbonitrile, m.p. 174–177° C. may be isolated—1,3,4,9,10,10aα-hexahydro-6-methoxy-9-oxo-4aα(2H)-phenanthrene carbonitrile.

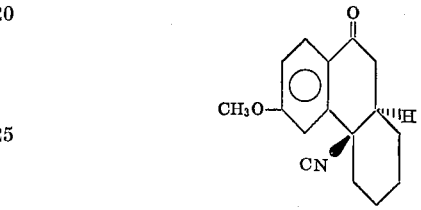

IR 2220 (very weak), 1685 (s), 1605 (s) cm.$^{-1}$

EXAMPLE III 1,3,4,9,10,10aα-Hexahydro-9-oxo-4aβ(2H)-phenanthrene carboxamide

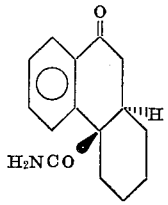

The product, m.p. 197–200.5° C. was prepared by the method of Example II using phenylacetonitrile in the place of m-methoxyphenylacetonitrile.

Elemental analysis.—Calc'd for $C_{15}H_{17}O_2$: Calc'd (percent): C, 74.05; H, 7.04; N, 5.76. Found (percent): C, 74.30; H, 7.04; N, 5.93.

IR 3330, 3130, 1670, 1665, 1590 m. cm.$^{-1}$.

EXAMPLE IV

4aβ-Aminomethyl-1,2,3,4,4a,9,10,10aα-octahydro-6-methoxyphenanthren-9-ol

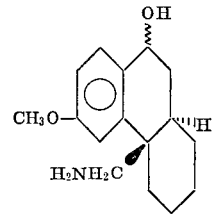

1,3,4,9,10α-hexahydro - 6 - methoxy - 9 - oxo - 4aβ-(2H)-phenanthrene carboxamide (30 g.) and lithium aluminum hydride (20 g.) in tetrahydrofuran (3 liters) were refluxed under nitrogen during 2 days. The cooled reaction mixture was treated dropwise with 100 ml. 3 percent NaOH solution, filtered and evaporated to crystalline residue suitable for further transformation. From diethyl ether-hexane the product presented a m.p. 149–151° C.

Elemental analysis.—Calc'd for $C_{16}H_{23}NO_2$: Calc'd (percent): C, 73.53; H, 8.87; N, 5.36. Found (percent): C, 73.24; H, 8.82; N, 5.33.

NMR (CDCl$_3$-D$_2$O): AB quartet of aminomethyl protons with J 13.5 cps. at 2.81 and 2.99, 3.84 (3H singlet, OCH$_3$), 4.83 (1H centre of approximate triplet C$_9$-H) p.p.m.

EXAMPLE V

4aβ-Aminomethyl-1,2,3,4,4a,10aα-hexahydro-6-methoxyphenanthrene

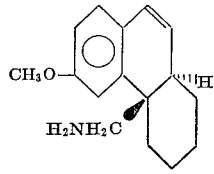

4aβ - aminomethyl - 1,2,3,4,4a,9,10,10aα-octahydro-6-methoxyphenanthren-9-ol (25 g., 8.5×10$^{-2}$ moles) and p-toluenesulfonic acid monohydrate (18 g., 9.5×10$^{-2}$ moles) in benzene (1 liter) were heated under reflux using a Dean-Stark head, after 1 hour the reaction mixture was stripped to a small volume diluted with diethyl ether and extracted with water. A crystalline precipitate separating at this point together with the aqueous extract were washed with diethyl ether (rejected), basified strongly with NaOH solution and extracted with diethyl ether (twice). The diethyl ether extracts were washed with brine, dried (Na$_2$SO$_4$), evaporated to a small volume and filtered through a Woelm alumina column (Grade I, basic 120 g.). The product (16 g.) eluted with diethyl ether was obtained as a colorless oil.

IR 1610, 1570 cm.$^{-1}$.

NMR (CDCl$_3$): 2.87 (2H multiplet W ½ H 5 cps.), 3.79 (3H s, —OCH$_3$), AB quartet J$_{9/10}$ 9 cps., protons centered at 5.48 (C$_{10}$-H) and 6.36 ((C$_9$-H) further split by C$_{10a}$-H, J$_{10a/10}$ 2.5 cps., J$_{9/10a}$ 3 cps.) p.p.m.

EXAMPLE VI

1,3,4,9,10,10aα-Hexahydro-6-methoxy-2H-10,4a(iminomethano)phenanthren-9β-ol, hydrochloride

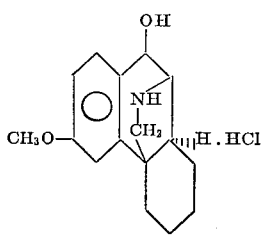

4aβ - Aminomethyl - 1,2,3,4,4a,10aα-hexahydro-6-methoxyphenanthrene (4.86 g., 2×10$^{-2}$ moles) in tetrahydrofuran (150 ml.) was treated with 0.5 N HClO$_4$ (80 ml., 4×10$^{-2}$ moles), cooled to 0° C. and treated, under nitrogen, with N-bromo-acetamide (3 g., 2.2×10$^{-2}$ moles) added over 1–2 minutes. Thin layer chromatography indicated that there was a rapid loss of starting material; after 20 minutes, excess NaOH solution (20 ml., 50 percent) and ice was added. The two phase solution was stirred for 45 minutes. After dilution with benzene the organic layer was washed with water (twice), brine, dried (Na$_2$SO$_4$) and evaporated to a residue which readily crystallized on trituration with boiling diethyl ether to give the product (4 g., free base form) double m.p. 140–143.5° C. and a high m.p. form, m.p. 174–177° C. The NMR's of both forms were identical only after deuterium exchange. Mass spectra were identical.

Elemental analysis.—Calc'd for C$_{16}$H$_{21}$NO$_2$: Calc'd (percent): C, 74.10; H, 8.16; N, 5.4. Found (percent): C, 73.69; H, 8.16; N, 5.34.

NMR (CDCl$_3$): 174–177° C. form: 2.53 (1H doublet J=10 cps., —CH$_2$—NH), 3.07 2H multiplet W ½ H 6 cps. exchangeable —OH and NH protons, 3.24 (1H doublet J$_{9/10}$ 4.5 cps., J$_{10/10}$ 0 cps. (H(OH)CH—NH) partial overlap with low field AB portion of CH$_2$·NH— 3.79 (3H s, —OCH$_3$), 4.66 (1H doublet, J$_{9/10}$ 4.5 cps.) p.p.m. The hydrochloride salt m.p. 244–245° C. crystallized from methanol-ether.

Elemental analysis.—Calc'd for C$_{16}$H$_{22}$O$_2$NCl: Calc'd (percent): C, 64.96; H, 7.50; N, 4.74; Cl, 11.95. Found (percent): C, 64.60; H, 7.47; N, 4.69; Cl, 11.72.

EXAMPLE VII

1,3,4,9,10,10aα-Hexahydro-6-methoxy-2H-10,4a-(iminomethano)-phenanthrene, hydrochloride

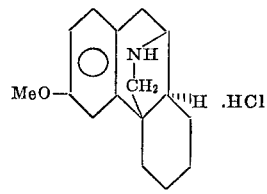

1,3,4,9,10,10aα - Hexahydro - 6 - methoxy-2H-10,4a-(iminomethano-phenanthren-9β-ol, hydrochloride, (8.0 g.), acetic acid (80 ml.), 70 percent perchloric acid (3 ml.) and 5 percent Pd on BaSO$_4$ (2.5 g.) were stirred at 80° C. in an atmosphere of hydrogen overnight (1 mole uptake). After cooling, 30 ml. of 10 percent K$_2$CO$_3$ solution was added and after filtration the reaction mixture was evaporated, basified with NaOH solution, taken into CH$_2$Cl$_2$ and washed with brine. After evaporation of the solvent, the residue in diethyl ether was filtered through a Woelm alumina column (Grade I, basic) and eluted with diethyl ether. The eluate was treated directly with iso-propanolic hydrogen chloride and the crystalline precipitate triturated with boiling acetone to give the product m.p. 228–231° C. (some previous decomposition).

Elemental analysis.—Calc'd for C$_{16}$H$_{22}$ONCl.¼H$_2$O: Calc'd (percent): C, 67.59; H, 7.98; N, 4.93; Cl, 12.47. Found (percent): C, 67.45, 67.35; H, 7.75, 7.84; N, 4.82, 4.67; Cl, 12.97.

EXAMPLE VIII

1,3,4,9,10,10aα-Hexahydro-6-methoxy-11-methyl-2H-10,4a-(iminomethano) phenanthrene, hydrochloride

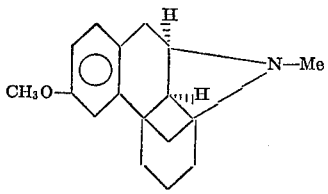

1,3,4,9,10,10aα - Hexahydro - 6-methoxy-2H-10,4a-(iminomethano)phenanthrene, hydrochloride (4 g., 1.43 ×10$^{-2}$ moles) in a stirred mixture of methylene chloride (300 ml.) and saturated NaHCO$_3$ solution (300 ml.) was treated with ethyl chloroformate (1.8 ml., 1.88×10$^{-2}$ moles) at room temperature during 30 minutes. After standing overnight, the organic layer was separated and evaporated. The residue in diethyl ether was washed with dilute HCl, brine, dried (Na$_2$SO$_4$) and evaporated to give the urethane (4.2 g.). The urethane in ether-tetrahydrofuran (1:1, 400 ml.) was heated under reflux with LiAlH$_4$ (2.5 g.) during 4 hours. After standing overnight the reaction mixture was treated with 12.5 ml. 3 percent NaOH solution, filtered and evaporated. The residue in diethyl ether was filtered through a Woelm alumina column (40 g., Grade I, basic) and eluted with diethyl ether. The total eluate was treated with isopropanolic hydrogen chloride and the precipitate after crystallization from acetone afforded 2.9 g. product, m.p. 238–240° C.

NMR (CDCl$_3$-D$_2$O): 2.9 (3H s N-CH$_3$), 3.88 (3H s-OCH$_3$), 3.38 (ca. 2H doublet J=3 cps.—actually center peaks of AB quartet CH$_2$—N—CH$_3$), p.p.m.

EXAMPLE IX 1,3,4,9,10,10aα-Hexahydro-11-methyl-2H-10,4a-(iminomethano) phenanthren-6-ol, hydrochloride

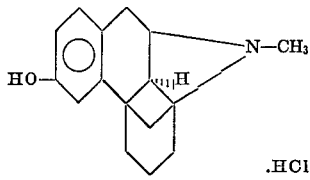

1,3,4,9,10,10aα - Hexahydro-6-methoxy-11-methyl-2H-10,4a (iminomethano) phenanthrene, hydrochloride (1.8 g.) and 47–49 percent aqueous hydrogen bromide (30 ml.) were heated under reflux during 45 minutes. The cooled reaction was treated with ice and an excess of concentrated ammonium hydroxide to give a crystalline precipitate of the product (free base form). After aging 1 hour the precipitate (1.6 g.) was filtered off. A small portion recrystallized from acetone had m.p. 223–225° C. (dec.).

Elemental analysis.—Calc'd for $C_{16}H_{21}ON$: Calc'd (percent): C, 78.97; H, 8.70; N, 5.76. Found (percent): C, 78.93; H, 8.91; N, 5.73.

The remainder in acetone was treated with a slight excess of isopropanolic hydrogen chloride and concentrated. The crystalline precipitate was recrystallized from methanol-diethyl ether, the product had m.p. 255–258° C. (with effervescence).

Elemental analysis.—Calc'd for $C_{16}H_{23}NOCl$: Calc'd (percent): C, 68.68; H, 7.93; N, 5.01; Cl, 12.67. Found (percent): C, 68.17; H, 7.86; N, 4.85; Cl, 11.97.

EXAMPLE X 1,3,4,9,10,10aα-Hexahydro-2H-10,4a-(iminomethano) phenanthren-6-ol

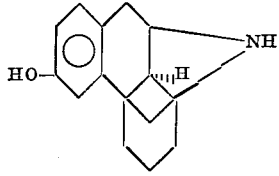

1,3,4,9,10,10aα - Hexahydro - 6-methoxy-2H-10,4a-(iminomethano)phenanthrene (1.6 g.) and 47–49 percent aqueous hydrogen bromide (30 ml.) were heated under reflux during 1 hour. The cooled reaction was treated with ice and an excess of concentrated ammonium hydroxide. A pale buff solid slowly separated overnight. The solid crystallized from methanol to give the product (660 mg.) m.p. 247–248° C.

EXAMPLE XI 1,3,4,9,10,10aα-Hexahydro-11-(3-methyl-2-butenyl)-2H-10,4a-(iminomethano) phenanthren-6-ol, hydrochloride

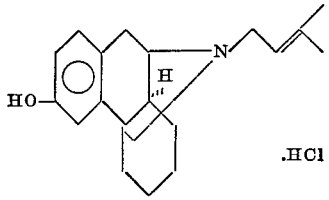

1,3,4,9,10,10aα - Hexahydro - 2H-10,4a-(iminomethano)phenanthren-6-ol (600 mg., 2.62×10⁻³ moles), 1-chloro-3-methyl-2-butene (300 mg., 2.87×10⁻³ moles), NaHCO₃ (340 mg., 4.5×10⁻³ moles) and dimethylformamide (10 ml.) were refluxed and stirred under nitrogen during 4.5 hours, and allowed to stand at room temperature for 36 hours. After filtration from precipitate the precipitate was washed with hot ethanol and the combined filtrates stripped. The crystalline residue was distributed between diethyl ether and NH₄OH solution. The ether extract was dried (Na₂SO₄) and evaporated to a crystalline residue. Recrystallization from diethyl ether-hexane afforded 500 mg. product (free-base form), m.p. 162–163° C. (some decomposition).

Elemental analysis.—Calc'd for $C_{20}H_{27}NO$: Calc'd (percent): C, 80.76; H, 9.15; N, 4.71. Found (percent): C, 80.62; H, 9.29; N, 4.49.

The hydrochloride salt m.p. 205–207° C. (with effervescence) crystallized from acetone.

Elemental analysis.—Calc'd for $C_{20}H_{28}NOCl \cdot \frac{1}{4} H_2O$: Calc'd (percent): C, 70.98; H, 8.49; N, 4.14; Cl, 10.48. Found (percent): C, 71.25, 71.29; H, 8.89, 8.79; N, 4.07, 4.15; Cl, 10.56.

What is claimed is:

1. A compound of the formula:

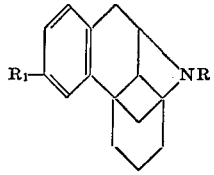

in which

R¹ is a member selected from the group consisting of hydrogen, hydroxy and lower alkoxy;

R is a member selected from the group consisting of hydrogen, lower alkyl, and lower alkenyl; and pharmaceutically acceptable acid addition salts thereof.

2. The compound of claim 1,

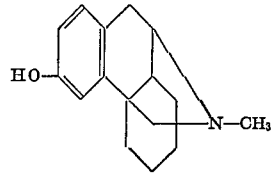

3. The compound of claim 1,

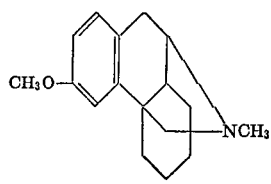

4. The compound of claim 1,

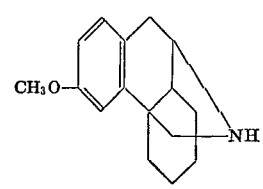

5. A process for the production of a 10,4a-iminomethanohydrophenanthrene which comprises:

(a) reacting an ester of 7-alkylsulfonyloxy-, 7-arylsulfonyloxy or 7-halo-hept-2-enoic acid in the presence of an alkali metal alkoxide or an alkali metal amide, with a compound of the formula:

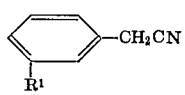

and subsequently hydrolyzing the product ester to obtain a compound of the formula:

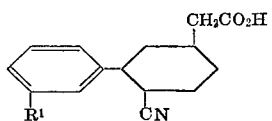

(b) cyclizing the product of step (a) in the presence of an acid at a temperature from −10° C. to about 35° C. to obtain the hydrophenanthrone:

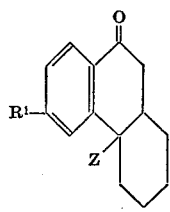

in which

Z is —CONH$_2$ or —CN;

(c) reacting said hydrophenanthrone with a metal hydride to obtain the amine:

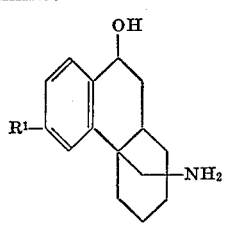

(d) introducing olefinic unsaturation into said amine product of step (c) by reaction in a dehydrating acid medium;

(e) internally cyclizing said amine to form a α-hydroxy-10,4a-iminomethano bridge, by addition of a halonium group to said olefinic unsaturation followed by ring closure and hydrohalide elimination;

the group $R^1$ being a member selected from the group consisting of hydrogen, hydroxy or lower alkoxy.

6. The process of claim 5 in which said halonium group of step (e) is produced by a hypochlorite, hypobromite, N-bromosuccinimide, or N-bromoacetamide.

7. The process of claim 5 in which said 9-hydroxy group of said 10,4a-iminomethanohydrophenanthrene product of step (e) is hydrogenated in the presence of a noble metal or a noble metal oxide catalyst to eliminate said 9-hydroxy group.

8. The process of claim 5 in which said 10,4a-iminomethanohydrophenanthrene product is N-alkylated or N-alkenylated with a sulfonyloxy- or halo-substituted member of the group consisting of lower alkyl and lower alkenyl.

References Cited
UNITED STATES PATENTS 3,723,437    3/1973    Wiesner ............ 260—285

JOSEPH A. NARCAVAGE, Primary Examiner

U.S. Cl. X.R.

260—326.27, 326.8, 326.84, 376.85, 465 D, 465 F, 465 R, 558 R, 570.8 TC; 424—274